US006999999B2

(12) United States Patent
Camble et al.

(10) Patent No.: US 6,999,999 B2
(45) **Date of Patent: *Feb. 14, 2006**

(54) SYSTEM AND METHOD FOR SECURING FIBER CHANNEL DRIVE ACCESS IN A PARTITIONED DATA LIBRARY

(75) Inventors: Peter Thomas Camble, Bristol (GB); Stephen Gold, Bristol (GB); Ian Peter Crighton, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 908 days.

This patent is subject to a terminal disclaimer.

(21) Appl. No.: 10/033,010

(22) Filed: Dec. 28, 2001

(65) Prior Publication Data

US 2003/0126360 A1 Jul. 3, 2003

(51) Int. Cl.
*G06F 15/167* (2006.01)
*G06F 13/00* (2006.01)

(52) U.S. Cl. ........................ 709/215; 711/112; 711/114; 711/154

(58) Field of Classification Search ................ 709/213, 709/214, 215, 226; 711/112, 114, 154
See application file for complete search history.

(56) References Cited

U.S. PATENT DOCUMENTS

| | | | | |
|---|---|---|---|---|
| 5,070,404 | A | 12/1991 | Bullock et al. | |
| 5,164,909 | A | 11/1992 | Leonhardt et al. | |
| 5,303,214 | A | 4/1994 | Kulakowski et al. | |
| 5,367,669 | A | 11/1994 | Holland et al. | |
| 5,416,914 | A | 5/1995 | Korngiebel et al. | |
| 5,442,771 | A | 8/1995 | Filepp et al. | |
| 5,734,859 | A | 3/1998 | Yorimitsu et al. | |
| 5,802,278 | A | 9/1998 | Isfeld et al. | |
| 5,805,864 | A | 9/1998 | Carlson et al. | |
| 5,819,309 | A | 10/1998 | Gray | |
| 5,835,940 | A | 11/1998 | Yorimitsu et al. | |
| 5,867,335 | A | 2/1999 | Ozue et al. | |
| 5,867,736 | A | 2/1999 | Jantz | |
| 5,890,014 | A | 3/1999 | Long | |
| 5,943,688 | A | 8/1999 | Fisher et al. | |
| 5,970,030 | A | 10/1999 | Dimitri et al. | |
| 6,009,481 | A * | 12/1999 | Mayer | 710/33 |

(Continued)

FOREIGN PATENT DOCUMENTS

EP 0859308 8/1998

(Continued)

OTHER PUBLICATIONS

European Search Report issued for EP 02 25 8806, dated Jan. 4, 2005.

(Continued)

*Primary Examiner*—Ario Etienne

(57) ABSTRACT

A storage area network associated data library partitioning system comprises a plurality of storage slot elements adapted to store data storage media, at least one set of at least one of the slots is assigned to one partition of a plurality of partitions, and a plurality of data transfer elements that are adapted to receive the media and transfer data to and from the media, each of at least one set of at least one of the data transfer elements is assigned to one of the partitions, at least one data transfer element of each of the partitions hosts a logical element designation of a virtual controller for each of the partitions, the virtual controllers restricting movement of the media to between the set of slots and the set of data transfer elements assigned to a same of the partitions.

24 Claims, 2 Drawing Sheets

U.S. PATENT DOCUMENTS

| | | | | |
|---|---|---|---|---|
| 6,038,490 | A | 3/2000 | Dimitri et al. | |
| 6,044,442 | A | 3/2000 | Jesionowski | |
| 6,084,736 | A | 7/2000 | Kurokawa et al. | |
| 6,085,123 | A | 7/2000 | Baca et al. | |
| 6,097,734 | A * | 8/2000 | Gotesman et al. | 370/474 |
| 6,295,578 | B1 | 9/2001 | Dimitroff et al. | |
| 6,335,927 | B1 | 1/2002 | Elliott et al. | |
| 6,336,172 | B1 | 1/2002 | Day, III et al. | |
| 6,421,196 | B1 | 7/2002 | Takayama et al. | |
| 6,421,711 | B1 | 7/2002 | Blumenau et al. | |
| 6,425,059 | B1 | 7/2002 | Basham et al. | |
| 6,446,141 | B1 | 9/2002 | Nolan et al. | |
| 6,507,896 | B1 | 1/2003 | Sanada et al. | |
| 6,519,678 | B1 | 2/2003 | Basham et al. | |
| 6,535,964 | B1 | 3/2003 | Sanada et al. | |
| 6,606,664 | B1 | 8/2003 | Darago et al. | |
| 6,618,796 | B1 | 9/2003 | Yamakawa et al. | |
| 6,633,954 | B1 * | 10/2003 | Don et al. | 711/114 |
| 6,636,958 | B1 | 10/2003 | Abboud et al. | |
| 6,681,303 | B1 | 1/2004 | Watanabe et al. | |
| 6,725,394 | B1 | 4/2004 | Bolt | |
| 6,731,625 | B1 | 5/2004 | Eastep et al. | |
| 6,742,034 | B1 | 5/2004 | Schubert et al. | |
| 6,799,255 | B1 * | 9/2004 | Blumenau et al. | 711/152 |
| 6,813,698 | B1 | 11/2004 | Gallo et al. | |
| 6,823,398 | B1 | 11/2004 | Lee et al. | |
| 6,832,272 | B1 * | 12/2004 | Hirakawa et al. | 710/36 |
| 6,839,804 | B1 * | 1/2005 | Don et al. | 711/114 |
| 6,842,784 | B1 | 1/2005 | Black | |
| 6,865,617 | B1 * | 3/2005 | Zeidner et al. | 710/3 |
| 6,877,073 | B1 * | 4/2005 | Sanada et al. | 711/152 |

FOREIGN PATENT DOCUMENTS

| | | |
|---|---|---|
| EP | 0 978 841 | 2/2000 |
| EP | 1 039 410 | 9/2000 |
| EP | 1156408 | 11/2001 |
| JP | 10269026 | 10/1998 |
| JP | 2001014257 | 1/2001 |
| JP | 09185465 | 7/2001 |
| JP | 2002304791 | 10/2002 |

OTHER PUBLICATIONS

Foreign Search Report dated Feb. 13, 2003.

IBM Technical Disclosure Bulletin, "Optical Disk Drive Loader for Work Station with Pluggable Magazine", vol. 38, No. 12, Dec. 1955, pp. 243-246.

IBM Technical Disclosure Bulletin, "Logical Grouping of Data Storage Media in a Library System", vol. 35, No. 5, Oct. 1992—pp. 17-20.

Massiglia, P., "The Raid Book", 6th edition, Feb. 1997, 83 pages.

"Sharing Backup Resources, " Ralph Cuellar; Apr. 2000.

"The Gator Tape Library Family Architecture, " John Kranz; Oct. 1999.

"Fibre Channel Fundamentals, " Tom Weimer.

"Spectra 12000 User Guide, " Sep. 2000.

* cited by examiner

SYSTEM AND METHOD FOR SECURING FIBER CHANNEL DRIVE ACCESS IN A PARTITIONED DATA LIBRARY

RELATED APPLICATIONS

The present invention is related to the following copending and commonly assigned U.S. patent applications: Ser. No. 10/034,691 entitled System and Method for Partitioning a Storage Area Network Associated Data Library, filed Dec. 28, 2001; Ser. No. 10/033,009 entitled System and Method for Partitioning a Storage Area Network Associated Data Library Employing Element Addresses, filed Dec. 28, 2001; Ser. No. 10/032,662 entitled System and Method for Managing Access To Multiple Devices in a Partitioned Data Library, filed Dec. 28, 2001; Ser. No. 10/032,923 entitled System and Method for Peripheral Device Virtual Functionality Overlay, filed Dec. 28, 2001; Ser. No. 10/034,518 entitled System and Method for Securing Drive Access to Media Based On Medium Identification Numbers, filed Dec. 28, 2001; Ser. No. 10/034,888 entitled System and Method for Securing Drive Access to Data Storage Media Based On Medium Identifiers, filed Dec. 28, 2001; Ser. No. 10/033,003 entitled Method for Using Partitioning to Provide Capacity on Demand in Data Libraries, filed Dec. 28, 2001; Ser. No. 10/034,580 entitled System and Method for Intermediating Communication with a Moveable Media Library Utilizing a Plurality of Partitions, filed Dec. 28, 2001; and Ser. No. 10/034,083, entitled System and Method for Managing a Moveable Media Library with Library Partitions, filed Dec. 28, 2001; the disclosures of which are hereby incorporated herein by reference.

TECHNICAL FIELD

The present invention generally relates to data storage and specifically to a system and method for securing fiber channel drive access in a partitioned data library.

BACKGROUND

In certain storage area networks (SAN) usage scenarios, such as may arise for storage service providers (SSPs), there are multiple customers attempting to share the same common SAN resources. In such cases, there is a need to ensure that customers can only see and access the storage resources they have been allocated and prevent them from accessing storage of other customers. For example, if a customer stores their critical business data with a SSP, then they generally do not want other customers of the SSP reading their data or even being aware that they have information stored with the SSP. The capability to partition a tape library is known. However, special hardware or special backup software as described below has been used to implement partitioning.

Existing software-based data library partitioning solutions typically employ a host system that restricts access to portions of a tape library. The host restrictions are implemented by a mediating software process on a host system to enforce partition restrictions. However, this approach is problematic. Specifically, the approach is undesirable if the data library is utilized in a SSP environment. In SSP environments, the data library and the host systems may belong to different entities (e.g., the SSP and the customers). Placement of software mediating processes on host systems is unattractive, because it increases the burden on the customers to make use of the storage service. Moreover, many customers are unwilling to allow other parties to place software on their host systems. Additionally, the software mediating process approach is typically incompatible with existing data back-up utilities, i.e., the software mediating process approach requires the use of specialized data back-up applications. Hence, users are effectively denied the ability to run desired backup software.

Existing fibre channel (FC) disk array firmware may be used to provide security in an FC redundant array of independent disks (RAID), since the disk array firmware has direct control over the array's ports connected to the SAN. Every host and device connection into the SAN generally has a unique FC-based world-wide-name (WWN), which can be used by an FC-based RAID to uniquely identify a device or host connection. Therefore, the FC-disk array firmware may be configured so that when a host attempts to send a small computer systems interface (SCSI) command to a FC-logical unit number (LUN) inside the RAID, the firmware will check the originating WWN from the server that sent the command against a list of authorized WWNs. If the WWN is on the list of authorized WWNs for that RAID FC-LUN, the SCSI command may be processed, if the WWN is not on the list of authorized WWNs for the RAID FC-LUN the command will be rejected. The list of authorized WWN's for each RAID FC-LUN may be configured via the existing management software for the RAID.

However, if a standard existing SCSI device, such as a data tape library is connected to a FC SAN via existing FC interfaces, such as existing FC tape drives in the library, it is not possible to secure these devices so that only certain hosts can access them, as individual existing FC tape drives do not support the FC WWN-based security discussed above. As a typical example, if a FC tape drive is connected to a SAN, it is visible to every server connected to that SAN. This circumstance is unacceptable for a SAN that offers secure storage resources to diverse customers. Existing solutions do not allow fibre channel tape drive devices to be secured in a SAN environment. The scheme to secure LUNs implemented in FC disk arrays, as discussed above, does not extend to securing physical tape drives that make up a logical partition within a SAN attached tape library.

FC switches have the capability of configuring security zones that define which WWNs or FC ports of a server can see which WWNs or FC ports of devices. However, this FC switch zoning does not extend to device LUNs, so it is only possible to provide security using such FC switch zoning at the FC port level. Even if tape libraries are directly attached on a FC SAN, it would be very difficult for a user to define security zones for the library tape drives. A data tape library can have multiple FC tape drives, and may be logically partitioned into partitions extending across multiple fibre channel tape drives. Therefore, it would be difficult for a user to correctly identify which FC ports and LUNs should be associated together in the same security zone for an FC switch. Understandably, a user may easily make mistakes in such a manual configuration process.

Access to stand-alone native FC devices may be secured by using switch zoning, facilitated by a one-to-one relationship between a stand alone FC drive and an accessing user's WWN. In a data library, the library controller is typically placed behind a bridge. Configuring an FC switch for switch zoning to secure such a controller adds a process for a SAN administrator to implement and coordinate with users. FC switch configuration is not typically under control of a library's management card.

SUMMARY OF THE INVENTION

One embodiment of a storage area network associated data library partitioning system comprises a plurality of storage slot elements adapted to store data storage media, at least one set of at least one of the slots is assigned to one partition of a plurality of partitions, and a plurality of data transfer elements that are adapted to receive the media and transfer data to and from the media, each of at least one set of at least one of the data transfer elements is assigned to one of the partitions, at least one data transfer element of each of the partitions hosts a logical element designation of a virtual controller for each of the partitions, the virtual controllers restricting movement of the media to between the set of slots and the set of data transfer elements assigned to a same of the partitions.

A preferred embodiment of a method according to the present invention for partitioning a storage area network associated data library comprises establishing a plurality of partitions in the data library, each of the partitions comprising at least one storage slot element and at least one data transfer element, each of the slots adapted to store media, and each of the data transfer elements adapted to receive the media and transfer data to and from the media, assigning a different logical element designation to each of the library partitions and assigning a same logical element designation as a partition to a virtual controller hosted by at least one of the data transfer elements in last the partition, and restricting movement of the media to between the slots and the data transfer elements assigned to a same partition.

DETAILED DESCRIPTION

The present invention is directed to system and method, which provide FC security for FC resources of a partitioned data library. A surrogate LUN for a library controller provided by one or more of the FC tape drives in an SCSI-based data library partitioning system and method may also be secured in accordance with the present invention. A physical data library implementing the present invention may be partitioned into multiple virtual library partitions, with each library partition having one or more physical drives, and a unique subset of library media slots, and a dedicated virtual library changer device LUN assigned to the partition as discussed below. Such a data library partitioning system and method is disclosed commonly-assigned in U.S. patent application Ser. No. 10/033,009 entitled "System and Method for Partitioning a Storage Area Network Associated Data Library Employing Element Addresses". Preferably the present invention does not require modification to existing library hardware for implementation. The present invention is preferably implemented employing firmware modifications to subject FC-based drives and library controller(s).

Figure 1:
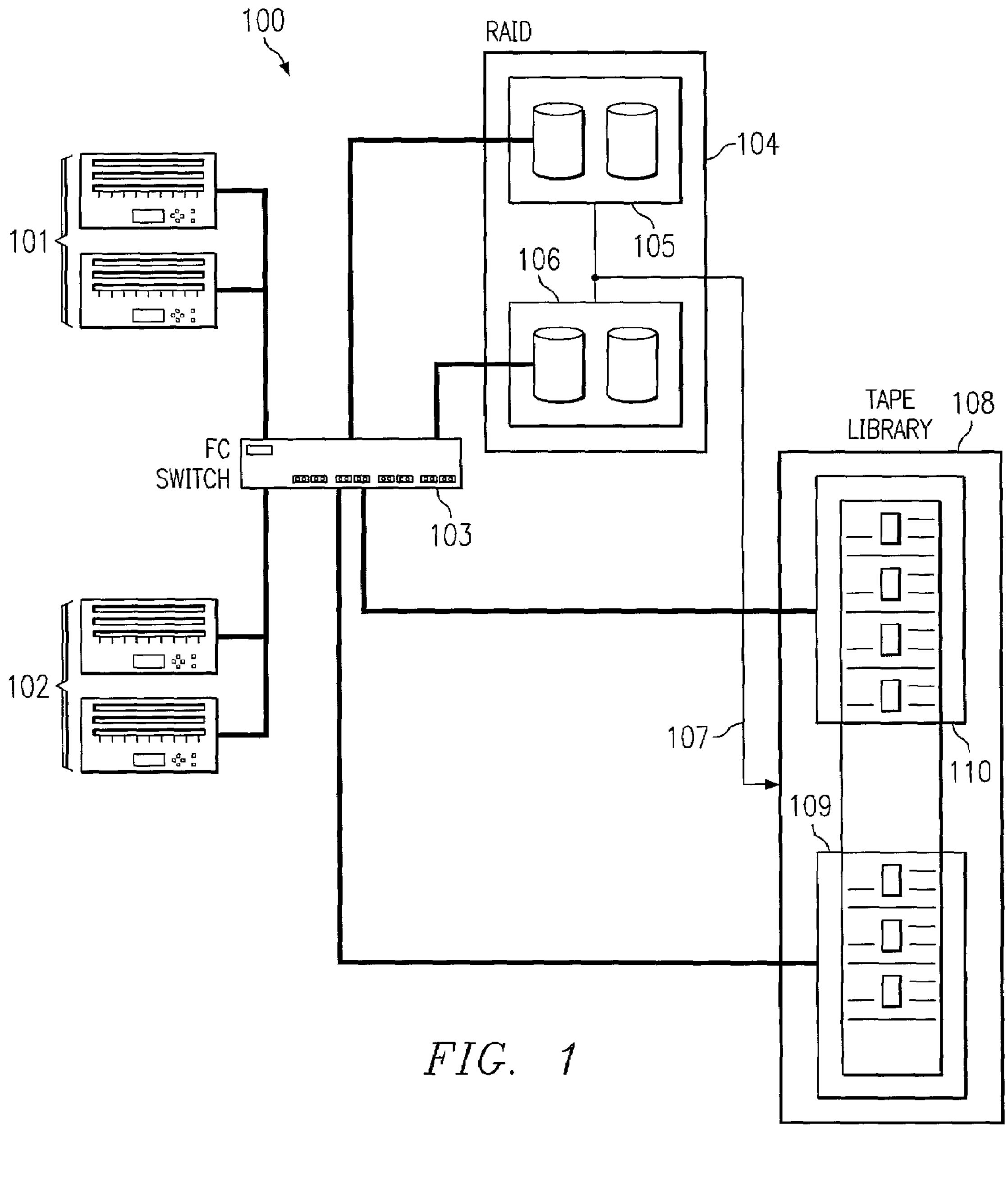
FIG. 1 is a diagrammatic illustration of a SAN operating in accordance with a preferred embodiment of the present invention.

Turning to FIG. 1, SAN 100 is shown. By way of example, first and second customer servers 101 and 102 are connected to SAN 100 via FC switch 103. RAID 104 may be partitioned using existing LUN-based RAID partitioning methods, for example, assigning first partition 105 to server 101 and second partition 106 to server 102. Zero downtime backups (ZDBs) may be performed of the data each server has on the RAID to tape library 108, via ZDB interconnectivity 107 between RAID 104 and tape library 108. Such ZDBs preferably employ data-mover firmware embodied in RAID 104 or other elements of SAN 100. Such ZDBs are preferably carried out without impinging on the processor operations or LAN capacity of servers 101 and 102. Tape library 108 is preferably partitioned employing the aforementioned system and method for library logical partitioning to insure that data for server 101 is maintained in partition 109 separate from data for server 102, and that the data of server 102 is maintained in partition 110 separate from data for server 101. Such partitioning facilitates implementation of the security system and method of the present invention to ensure that the servers may not access each other's data even though their data is maintained in the same physical library.

Figure 2:
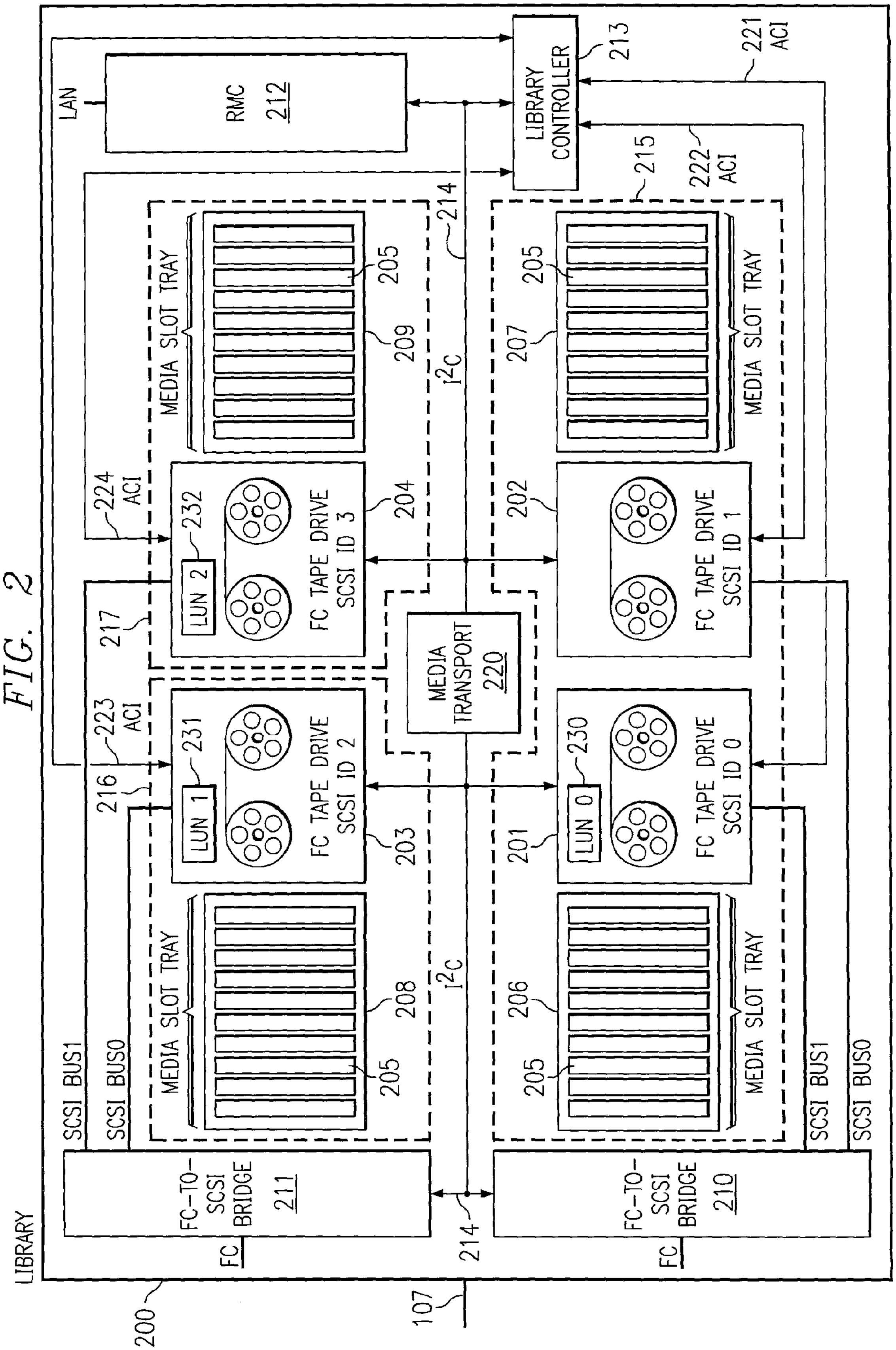
FIG. 2 is a diagrammatic illustration of an example of a data library operating in accordance with an embodiment of the present invention.

Data tape library 200 employing a preferred embodiment of the present system and method is illustrated in FIG. 2 as an example of a library that may be employed as library 108 of FIG. 1. However, other library designs and/or capacities may embody the present system and method. Exemplar data tape library 200 has four FC tape drives 201–204 serving as data transfer elements; forty media storage slots 205 organized into four trays 206–209 of ten slots 205 each; two FC-to-SCSI bridges 210 and 211; a library management interface card or remote management card (RMC) 212; library controller 213 and robotic media transport 220. The bridges, drives, transport, RMC and controller are preferably interconnected by inter-integrated circuit bus ($I^2C$) 214. Additionally, drives 201–204 and library controller 213 preferably communicate with each other using dedicated automated control interface (ACI) links 221–224 or the like, independently extending between each drive 201–204 and controller 213. Preferably, each drive is a FC device and has a FC address on a SAN with which the library is associated.

For partitions employed by a preferred embodiment of the present system and method, a subset of media slots 205 and tape drives 201–204 should be assigned to each partition, and a virtual library controller or dedicated virtual library changer device should be addressable with respect to each partition for control of library robotic media transport 220. The example partitioning shown in FIG. 2 is indicated by boxes 215, 216 and 217. As illustrated, SCSI LUN0 (230) corresponds to partition 215, SCSI LUN1 (231) corresponds to partition 216 and SCSI LUN2 (232) corresponds to partition 217. Mailslots or import/export elements may be assigned to each partition or configured for use by the entire library. Preferably, easily accessible media storage slots are configured as mailslots.

Preferably, a FC device in each partition, such as drives 201–204, may host one or more FC LUNs. SCSI commands to the drive itself are preferably directed to LUN 0. Each drive may present a virtual controller as surrogate LUN1. Preferably, only one drive in a partition presents a virtual controller for that partition. Controller 213 dictates which drive in a partition presents the virtual controller. Controller 213 configures the drive to provide the virtual controller via ACI 221, 222, 223 or 224.

SCSI commands to a virtual controller LUN received by a drive are passed to controller 213 over the drive's ACI. Controller 213 sends SCSI responses back to the drive over the drive's ACI 214. The drive, in turn, sends these SCSI responses over the FC SAN from the virtual controller LUN. The SCSI commands and responses are preferably sent over the ACI in a suitable form, packaged as an ACI message packet. The drive's firmware preferably supports functionality to facilitate hosting the virtual controller or surrogate LUN and pass back and forth SCSI messages to and from controller 213 over the drive's ACI. It is irrelevant to a drive which partition it is in, nor is it pertinent to a drive which logical controller is being addressed by an SCSI command. Controller 213 determines and maintains which drive of a partition is hosting the logical controller LUN. So, since the ACI is a point-to-point connection, as opposed to a bus (i.e. there is an ACI port on the controller for each drive, each of which connects to only one drive), when controller 213 receives SCSI commands over an ACI link, the commands are addressed to one particular logical controller. Therefore, when controller 213 receives a SCSI command from a logical controller of a drive, controller 213 can identify the partition based on the originating drive.

For each partition configured there will be one drive that hosts the logical controller LUN for that partition. As indicated above, the drive hosting the logical controller for the partition is determined by controller 213. Advantageously, if a drive in a partition fails, or is inadvertently disconnected from the FC SAN, the controller may configure one of the other drives in the partition to take over the logical library LUN hosting for that partition.

Access to existing stand-alone native FC devices may be restricted by using switch zoning, as discussed above. This is facilitated by the one-to-one relationship between an existing stand-alone FC drive and an accessing user's WWN. However, in a partitioned SCSI data library, library controller 213 is preferably placed behind a bridge, such as FC-to-SCSI bridge(s) 210 and/or 211. In such a situation, configuring an FC switch for switch zoning to secure controller 213 adds a process for a SAN administrator to implement and coordinate with users. FC switch configuration is not traditionally under control of a library management card and manual configuration of switch zoning is prone to error.

In accordance with the present inventive system and method native FC tape drives 201–204 may support security based on WWN or other unique host device identifiers without the need for switch zoning and the related manual configuration. To provide a more usable one-step configuration process such security may be established and modified via management card 212.

If all the tape drives 201 through 204 deployed in library 200 are FC tape drives and library controller 213 is not on a common bus with an FC-to-SCSI bridge, such as bridges 210 or 211, the library can be configured so that an instance of the library controller, one per partition, is accessed as surrogate LUNs 230, 231 and 232, via one tape drive in each partition. In the example illustrated in FIG. 2, surrogate LUN0 (230) for partition 215 is provided by drive 201 while surrogate LUN1 (231) and surrogate LUN2 (232) are provided by drives 203 and 204, respectively, for partitions 216 and 217, respectively. The FC security of tape drives 201–204 and library controller LUN(s) 230–232 is preferably configured by a user via RMC 212. Additionally, RMC 212 defines which tape drives are in which partition.

To provide security in this fibre channel environment, a user may also configure which SAN hosts have access to partition resources such as tape drives, library controller and media in each partition, via a control interface of RMC 212. This security configuration may be carried out via a web browser interface or via a network management protocol interface. For example, the user may select an active partition and configure the partition to either be unsecured, allowing all hosts access, or restrict access to a list of host WWNs or similar unique host device identifiers. To provide maximum flexibility, by default a partition's security level is preferably set to unsecured. To prevent all hosts from accessing a partition, the partition may be configured with an empty list of WWNs. Conversely, access by all hosts to disabled resources not in an active partition is preferably restricted.

Preferably, the security configuration of a tape drive applies to access to the tape drive itself, which will include any extended third-party copy command, such as ZDBs, that the tape drive supports. The security configuration of a tape drive will also preferably apply to any library controller surrogate LUN 230 through 232 the tape drive is hosting or supporting. Preferably, RMC 212 has no need to know which tape drive in a partition is hosting a surrogate LUN. Preferably, all tape drives in a partition have the same security settings. Therefore, as long as one of the tape drives in a partition hosts a surrogate LUN, for example as shown for partition 215 of FIG. 2, the surrogate LUN 230 and drives 201 and 202 under the surrogate LUN will have the required security settings applied. Preferably, as discussed above, the firmware of the library controller determines which tape drive holds the library controller surrogate LUN for that partition. Alternatively, the firmware of the controller and the firmware of the tape drives may negotiate as to which tape drive holds the library controller surrogate LUN for each partition.

Preferably, a FC drive blocks the ability for a host connected to the associated SAN to see the drive. In other words, the drive does not respond to any SCSI commands (e.g. SCSI inquiry, etc.) based on the host's WWN. However, because the WWN is not sent in each SCSI command, a drive preferably filters based on source ID for the host assigned by a name server, as detailed below.

When a partition is reconfigured, the FC security settings of a tape drive are preferably reconfigured. RMC 212 sends a security configuration request to library controller 213 over $I^2C$ bus 214. According to a preferred embodiment, library controller 213 passes the security configuration request, in the format of a special ACI command, to the tape drive(s) via the ACI port of the tape drive(s). Since the FC-LUN security in the tape drives is configured out-of-band via the ACI, the SCSI bus used to carry data to and from the drive need not be used to configure security.

FC commands generally do not contain the WWN of the originating host. However, FC commands use a source ID. Therefore, in accordance with the present invention a tape drive should also maintain an FC source ID-to-WWN mapping. The tape drive should gather information regarding source ID-to-WWN mappings from a SAN-associated name server at login, and issue a request state change notification to the name server to be informed of any changes in these mappings. If new WWNs are added to a security look-up table maintained by an FC tape drive, the drive should query the name server for the source ID of this new WWN. Preferably, the source ID of each incoming command, whether issued to a tape drive or a surrogate LUN hosted by an FC tape drive, will be compared against the FC drive or surrogate LUN's security configuration and used to determine security access. If the source ID matches the source ID mapped to a WWN in the tabulated security settings then access is allowed. If the security setting for the drive or surrogate LUN is unsecured then access is allowed regardless of the source ID.

If security access to a partition is changed then the new security settings of that partition will preferably be sent to all tape drives in the partition. When a tape drive's firmware receives a security configuration request over the ACI it should erase its current security settings and then store in non-volatile random access memory (NVRAM) the new list of authorized WWNs, or an unsecured setting, contained in the security configuration request. A security configuration request to each affected FC tape drive may contain a list of authorized WWNs for that device. Where a library partition is unsecured and thus available to any initiator WWN, a security configuration request will leave a drive unsecured. The default configuration for a tape drive is preferably unsecured. Finally, if a security configuration request establishes an empty list of WWNs for a tape drive, the tape drive should not be part of an active partition and is thus disabled preferably disallowing only access at all to the drive by any user.

The library management firmware can use a security configuration request to clear any security information to an unsecured state. This may be required if the user wishes to set the library back to factory defaults or if the library management firmware detects a replacement FC tape drive that contains security information from another library which needs to be overwritten. If a tape drive is added or removed from a partition, the security settings of that tape drive are preferably altered to reflect the security settings of the new partition.

As noted above, preferably, only firmware modifications to an existing library are required to employ the present invention. The modifications may need to be made to tape drive firmware to implement surrogate LUN functionality and to implement WWN-based filtering. The firmware of the library controller may need to be modified to give the controller the ability to configure the FC drives to use multiple logical controller surrogate LUN functionality to configure the FC drives to use WWN based filtering on a per-partition basis. As pointed out above, preferably, no hardware modifications are required.

As one skilled in the art should recognize the present system and method is well-suited for use with other types of drive to SAN interfaces, for example internet small computer systems interface (iSCSI). Preferably, the only change for iSCSI devices to use the present system and method is that the iSCSI equivalent of the FC source ID and/or WWN, such as iSCSI name, is used to authenticate initiators for access to secured devices.

What is claimed is:

1. A storage area network associated data library partitioning system comprising:

a plurality of storage slot elements adapted to store data storage media, at least one set of at least one of said slots is assigned to one partition of a plurality of partitions;

a plurality of data transfer elements that are adapted to receive said media and transfer data to and from said media, each of at least one set of at least one of said data transfer elements is assigned to one of said partitions, at least one data transfer element of each of said partitions hosts a logical element designation of a virtual controller for each of said partitions, said virtual controllers restricting movement of said media to between said set of slots and said set of data transfer elements assigned to a same of said partitions.

2. The system of claim 1 wherein at least one of said partitions is secured and access to a particular one of said secured partitions is restricted to users of said library having a unique host device identifier that is listed in a list of unique host device identifiers for access to said particular partition.

3. The system of claim 2 wherein a blank listing of unique host device identifiers for a secured partition results in said secured partition being secured from access by any users.

4. The system of claim 2 wherein said list of unique host device identifiers is maintained by at least one data transfer element in each of said partitions.

5. The system of claim 2 wherein said unique host device identifiers are world wide names.

6. The system of claim 2 wherein said unique host device identifiers are iSCSI names.

7. The system of claim 1 wherein at least one of said partitions is unsecured allowing access to said unsecured partitions by any user of said library.

8. The system of claim 1 wherein at least one of said elements is disabled and said at least one disabled elements may not be accessed by any users.

9. The system of claim 1 wherein said data transfer elements are fiber channel connected data tape drives.

10. The system of claim 1 wherein said logical element designations are small computer systems interface logical unit numbers.

11. The system of claim 10 wherein said virtual controller logical unit numbers are arranged under a small computer systems interface identification of said library.

12. A method for partitioning a storage area network associated data library comprising:

establishing a plurality of partitions in said data library, each of said partitions comprising at least one storage slot element and at least one data transfer element, each of said slots adapted to store media, and each of said data transfer elements adapted to receive said media and transfer data to and from said media;

assigning a different logical element designation to each of said library partitions and assigning a same logical element designation as a partition to a virtual controller hosted by at least one of said data transfer elements in said partition; and restricting movement of said media to between said slots and said data transfer elements assigned to a same partition.

13. The method of claim 12 further comprising:

securing selected ones of said partitions by assigning a list of unique host device identifiers which may access each of said partitions.

14. The method of claim 13 further comprising:

maintaining said list of unique host device identifiers that may access a partition in at least one of said data transfer elements in said partition.

15. The method of claim 13 further comprising:

securing selected ones of said partitions by allowing no users to access a partition having a blank list of unique host device identifiers.

16. The method of claim 12 further comprising:

disabling at least one of said elements; and preventing access to said at least one disabled elements by any user.

17. The method of claim 12 wherein said logical element designations are small computer systems interface logical unit numbers.

18. A partitioned storage area network with an associated data library, said network comprising:

a data storage array that is divided into partitions, each of said partitions assigned a logical unit number;

data-mover interconnectivity that extends between said data storage array and said associated data library, via at least one bridge;

a library management interface that accepts user input partitioning said library and assigns a logical unit number corresponding to logical unit numbers of said array partitions to library partitions, each of said library partitions comprising:

a set of at least one storage element slot, each slot comprised of a plurality of storage element slots, said slots are adapted to store data storage media; and a set of at least one data transfer element, said data transfer elements are adapted to receive said media and transfer data to and from said media, at least one data transfer element in each of said partitions comprising a virtual controller that restricts movement of said media to between said set of slots and said set of data transfer elements assigned to a same partition; and at least one data mover for direct communication from said array to said library.

19. The network of claim 18 wherein said partitions are secured by assigning each of said partitions a list of unique host device identifiers which may access that partition.

20. The network of claim 19 wherein said list of unique host device identifiers for a partition is maintained by at least one of said data transfer elements in that partition.

21. The network of claim 19 wherein said unique host device identifiers are world wide names.

22. The network of claim 19 wherein said unique host device identifiers are iSCSI names.

23. The network of claim 18 wherein at least one of said elements is disabled and said at least one disabled elements may not be accessed by any users.

24. The network of claim 18 wherein at least one of said data movers is disabled and said disabled data movers may not be accessed by any users.

* * * * *